E. M. JONES.
TRAIN CONTROLLING DEVICE.
APPLICATION FILED MAR. 16, 1911.
1,109,679.
Patented Sept. 8, 1914.
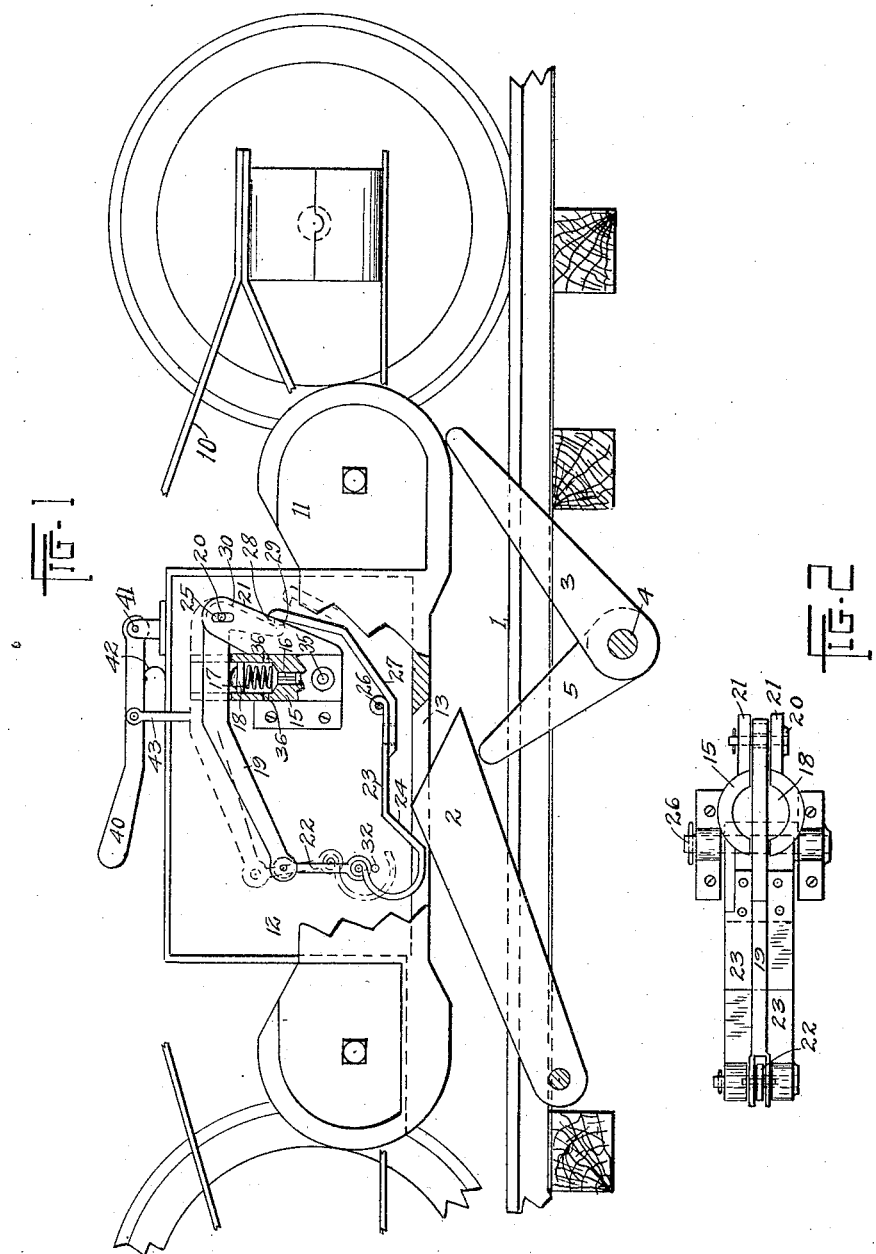
Witnesses
Inventor
Elmer M. Jones,
By Albert H. Bates,
Atty

UNITED STATES PATENT OFFICE.

ELMER M. JONES, OF ATLANTA, GEORGIA, ASSIGNOR TO JONES SIGNAL SYSTEM COMPANY, OF ATLANTA, GEORGIA, A CORPORATION OF GEORGIA.

TRAIN-CONTROLLING DEVICE.

1,109,679. Specification of Letters Patent. Patented Sept. 8, 1914.

Application filed March 16, 1911. Serial No. 614,915.

*To all whom it may concern:*

Be it known that I, ELMER M. JONES, a citizen of the United States, residing at Atlanta, in the county of Fulton and State of Georgia, have invented a certain new and useful Improvement in Train-Controlling Devices, of which the following is a full, clear, and exact description, reference being had to the accompanying drawings.

This invention relates to train controlling devices adapted to be installed upon a locomotive or other moving vehicle and operated by mechanism located along the trackway.

More particularly the invention provides mechanism so operated for releasing the air to apply the brake.

The objects of the invention are to provide such mechanism in a form which shall be very efficient and certain in operation, while being simple and cheap in construction.

The particular characteristics of the present invention are hereinafter more fully explained so that, for the present, the invention may be conveniently summarized as consisting of the combinations of coöperating elements explained herein and summarized in the claims.

In the drawings, Figure 1 is a side elevation of my mechanism applied to a vehicle truck, portions of the mechanism being broken away; this view showing also the coöperating track trip. Fig. 2 is a plan of my air releasing device on the vehicle.

Referring to the parts shown by numerals, 1 represents the track; 2 a suitable trip or ramp adapted to be raised into position to coöperate with the air releasing device on the locomotive.

3 indicates a lever adapted to be engaged by a member on the locomotive; 4 a rock shaft to which said lever is secured, and 5 another lever secured to said rock shaft, this latter lever operating to raise the ramp 2. In normal position the lever 3 extends approximately vertically, and the ramp 2 is below the path of the mechanism of the locomotive. When, however, a bumper of the locomotive strikes the lever 3, the arm 5 raises the ramp 2 into the position shown in Fig. 1, which causes that ramp to become effective on the air controlling mechanism to be described.

10 in Fig. 1 represents the frame of the truck of the vehicle and is to be taken as an illustration of any suitable stationary part of the vehicle. Secured to this frame is a casting 11, having an open box-like portion, 12, which carries my air releasing mechanism. The forward under portion of the casting 11 is shown as constituting the bumper which impinges the arm 3, and such impingement raises the ramp 2 into the slot 13 in the bottom of the casting. In this position the ramp may engage the air releasing mechanism, which I will now describe.

15 in Fig. 1 is the body of the air valve. Within this body is a chamber having a seat which is occupied by the plug valve 16. On top of this valve is a spring, 17, and above the spring is a head, 18. Bearing on this head is an arm, 19, of a lever, which is loosely pivoted at 20 to ears, 21, projecting from the valve casing. After passing across the head 18, the lever arm, 19, at its free end is pivotally connected with a link, 22, to the lower end of which is pivotally secured a bar, 23, which extends first downwardly, preferably in the arc shown, and then diagonally upwardly as shown at 24, and then along substantially horizontally. At its other end, the bar 23 is pivoted to a stationary pin, 26. Secured to the bar 23 near its pivoted end is an extension bar, 27, which, extending diagonally upward, has at its extreme end a toe, 28, which is adapted to overhang a toe, 29, on the lower end of an arm 30 on the lever 19.

From the construction described it will be seen that the lever 19 is normally held down at each end, the slot 25 around the pin 20 preventing that portion normally acting to hold the lever. The center line of the valve being to the left of the pivot point 26, the action of the air pressure upwardly on the valve tends to raise the right hand portion of the lever 19 and draw up the bar 27, and correspondingly pull down the bar 23, and with it the link 22 and the left hand end of the lever 19. The normal position of the parts is, therefore, that shown in full lines in Fig. 1, wherein the lower end of the link 22 abuts the stop pin 32. With the parts in this position and the vehicle traveling from left to right, it will be apparent that when the ramp 2, which has become raised, engages the incline 24 of the bar 23, that bar will be swung on its pivot, causing the toes 28 and 29 to disengage, thus releasing the lever 19 and allowing it to move upwardly under the air pressure into the position shown in dotted lines. This releases the air, which comes into the valve through the passageway 35, and allows it to escape through the passageways 36, thus applying the brake.

The purpose of the double anchorage of the lever 19 by the mechanism shown is so that all of the parts concerned in holding the valve closed are necessary for that action, so that if any of them should become broken, distorted or removed, the valve would automatically open and apply the brake. This is an important point, as it renders the device thoroughly reliable against tampering or accidents.

I provide at the top of the box 12 a re-setting lever 40, which is shown as pivoted at 41, normally held up by a spring 42 and provided with a plunger 43, adapted to bear downwardly on the arm 19. Accordingly, after the device has operated, the arm 19 comes into the position shown in dotted lines; to re-set, it is only necessary to press downwardly on the lever 40. The slot in the ear 21, into which the pin 20 projects, limits the movement of the lever 19 so that it never gets out of re-setting bounds.

Having described my invention, what I claim is:

1. In a device of the character described, the combination of a valve, a bodily movable member for holding it closed, means acting on said member on opposite sides of the valve for holding the member at two points either of which may move to release the valve, and means for effecting such movement.

2. In a mechanism of the class described, the combination with a valve of a bodily movable bar extending across the valve and bearing intermediately against it, a movable anchorage for each end of said bar, and means for releasing said bar when desired at one end.

3. In a device of the character described, the combination with a valve, of a member acting intermediately thereon to hold it closed, a movable holding device for said member on one side of the valve and a separable latch for the member on the other side, one portion of which is connected with said movable holding device, and means for releasing said latch by moving said holding device.

4. In a device of the character described, the combination with an air valve of members normally connected in a circuit and acting on the valve to hold it closed, said circuit of members being pivoted at one point and being separable at another, and means for moving such parts on said pivot.

5. In a mechanism of the class described, the combination with an air valve of a bodily movable bar for holding it closed, a pivoted member, a link connecting said member with the bar on one side of the valve and a latch connecting said member with the bar on the other side of the valve, and means for swinging said member on its pivot to cause the latch to release the bar.

6. In a device of the character described, the combination with an air valve of a bar bearing thereon intermediately, a member, a link connecting said member with said bar on one side of the valve, the bar and the member being provided on the other side of the valve with engageable toes, and a pivot for said member out of alinement with the valve.

7. In a device of the character described, the combination with an air valve of a pivoted member designed to operate the same, said member having an inclined engageable surface and two points of connection between said member and the bar, one point being on one side of the valve and the other on the other, one of such points being separable.

8. In a device of the character described, the combination with a valve casing of a valve therein, a bar bearing intermediately on the valve, a member intermediately pivoted and formed for engagement with an operating device, a link connecting said member on one side of the pivot with the bar, and engageable shoulders on the bar and member adapted to connect them on the other side of said pivot.

9. In a mechanism of the class described, the combination with an air valve of a bodily movable bar straddling the same, a pivoted operating member, means connecting said member and bar on one side of the valve and a pair of separable shoulders normally connecting the bar and member on the other side of the valve, and a loose pivot for the bar, enabling it to move bodily and to swing approximately about such pivot.

10. In mechanism of the character described, the combination with a valve, of a bodily movable bar for holding it closed, movable mechanism attached to said bar on both sides of the valve, a latch in said mechanism on one side the release of which allows the bar to move, and mechanism for resetting the parts.

11. In a device of the character described, the combination with a valve and valve casing of a lever loosely pivoted to an ear on the valve casing, a pivoted operating member, a link connecting the same on one side of the pivot with said lever, said operating member having a toe, and means for swinging said operating member on its pivot to disengage said toe, thereby releasing the lever at both ends.

12. In a mechanism of the class described, the combination with a valve of a member for holding it closed, an operating member, means connecting said two members on one side of the valve and separable means connecting the members on the other side, means for moving the operating member to cause such separation, and mechanism for resetting the parts after being separated.

13. In a mechanism of the class described, the combination with a suitable frame adapted for attachment to a moving vehicle of a valve casing carried by said frame, a valve within said casing, an operating lever pivotally mounted in said frame and having a portion adapted to engage a suitable operating device, a member for holding the valve closed, a link connection between said member and said lever on one side of the valve, a separable latch connecting said member and said lever on the other side of the valve, and resetting means carried by said frame.

In testimony whereof, I hereunto affix my signature in the presence of two witnesses.

ELMER M. JONES.

Witnesses:
 JESSE DRAPER,
 B. F. MORKERT.

---

Copies of this patent may be obtained for five cents each, by addressing the "Commissioner of Patents, Washington, D. C."